(12) United States Patent
Tsuchiya

(10) Patent No.: US 8,553,099 B2
(45) Date of Patent: Oct. 8, 2013

(54) IMAGING TERMINAL, DISPLAY TERMINAL, DISPLAY METHOD, AND IMAGING SYSTEM

(75) Inventor: Hitoshi Tsuchiya, Tokyo (JP)

(73) Assignee: Olympus Corporation, Tokyo (JP)

( * ) Notice: Subject to any disclaimer, the term of this patent is extended or adjusted under 35 U.S.C. 154(b) by 375 days.

(21) Appl. No.: 12/853,673

(22) Filed: Aug. 10, 2010

(65) Prior Publication Data

US 2011/0043663 A1 Feb. 24, 2011

(30) Foreign Application Priority Data

Aug. 20, 2009 (JP) .................... 2009-191068

(51) Int. Cl.
*H04N 5/232* (2006.01)
(52) U.S. Cl.
USPC .............. 348/211.2; 348/333.05; 348/207.11; 348/211.9; 348/345
(58) Field of Classification Search
USPC .......... 348/211.2, 211.9, 207.11, 333.05, 345
See application file for complete search history.

(56) References Cited

U.S. PATENT DOCUMENTS 7,492,406 B2 * 2/2009 Park et al. ................ 348/333.05
2009/0009531 A1 * 1/2009 Sudo et al. .................... 345/629

FOREIGN PATENT DOCUMENTS

JP 11-261875 A 9/1999
JP 2009-021880 A 1/2009

OTHER PUBLICATIONS

Japanese Office Action dated Apr. 9, 2013, issued in corresponding Japanese Patent Application No. 2009-191068, with English translation (9 pages).

* cited by examiner

*Primary Examiner* — Tuan Ho
*Assistant Examiner* — Angel L Garces-Rivera
(74) *Attorney, Agent, or Firm* — Westerman, Hattori, Daniels & Adrian, LLP

(57) ABSTRACT

An imaging unit sequentially outputs original image data into which a light flux incident on an imaging area has been photoelectrically converted in a frame. An image processing unit generates image data of a first image size from original image data of a portion corresponding to a first area within the imaging area. A magnification generation unit generates image data of a second image size from original image data of a portion corresponding to a second area as a partial area within the first area. A transmission image generation unit extracts a part from the image data of the first image size and the image data of the second image size in the frame unit. A WLAN interface wirelessly sequentially transmits image data of the first image size and image data of the second image size extracted.

7 Claims, 7 Drawing Sheets

IMAGING TERMINAL, DISPLAY TERMINAL, DISPLAY METHOD, AND IMAGING SYSTEM

BACKGROUND OF THE INVENTION

1. Field of the Invention

The present invention relates to an imaging terminal, a display terminal, a display method, and an imaging system. More particularly, the present invention relates to an imaging terminal which has an imaging function and transmits image data, and a display terminal which receives the image data transmitted from the imaging terminal and displays an image. More particularly, the present invention relates to a display method which receives image data transmitted from an imaging terminal and displays an image, and an imaging system having an imaging terminal and a display terminal.

Priority is claimed on Japanese Patent Application No. 2009-191068, filed Aug. 20, 2009, the content of which is incorporated herein by reference.

2. Description of Related Art

Recently, wireless network technologies have come into wide use. Even for digital cameras, products equipped with a wireless LAN or adaptors for connecting to the wireless LAN are appearing. In a wireless network technology, a terminal such as a PC receives a live view captured by a digital camera in real time via a wireless network, so that a user may remotely capture an image while checking the live view by the terminal. As a method of adjusting framing or focus by remotely controlling the digital camera as described above, a technology is disclosed in Japanese Unexamined Patent Application Publication No. 11-261875.

SUMMARY OF THE INVENTION

According to a first aspect of the present invention, there is provided an imaging terminal including: an imaging unit which sequentially outputs original image data into which a light flux incident on an imaging area has been photoelectrically converted in a frame; an image processing unit which generates image data of a first image size from the original image data of a portion corresponding to a first area within the field of view, and generates image data of a second image size from the original image data of a portion corresponding to a second area as a partial area within the first area; an extraction unit which extracts a part from the image data of the first image size and the image data of the second image size generated by the image processing unit in the frame; and an external interface which wirelessly sequentially transmits the image data of the first image size and the image data of the second image size extracted by the extraction unit.

Preferably, in the imaging terminal of the present invention, the imaging unit may include an optical system having a focus lens which adjusts focus. The extraction unit may increase a ratio of extraction of the image data of the second image size to the image data of the first image size during driving of the focus lens.

Preferably, in the imaging terminal of the present invention, the imaging unit may include an optical system having a zoom lens which adjusts an image magnification. The extraction unit may increase a ratio of an extraction of the image data of the first image size to the image data of the second image size during driving of the zoom lens.

Preferably, in the imaging terminal of the present invention, the imaging unit may include an optical system having a focus lens which adjusts focus. The image processing unit may set the second image size to be larger than the first image size during driving of the focus lens.

Preferably, in the imaging terminal of the present invention, the image processing unit may conduct an image compression process for the image data of the first image size and the image data of the second image size.

Preferably, in the imaging terminal of the present invention, the imaging unit may include an optical system having a focus lens which adjusts focus. The image processing unit may conduct an image compression process for the image data of the second image size at a compression rate which is lower than that of an image compression process for the image data of the first image size, during driving of the focus lens.

Preferably, in the imaging terminal of the present invention, the image processing unit may recognize an area of a face portion of a person within the imaging area from the original image data, and decide the second area based on a recognition result of the area of the face portion.

Preferably, in the imaging terminal of the present invention, the external interface may receive an instruction from an external terminal. The image processing unit may decide the second area based on the instruction.

Preferably, in the imaging terminal of the present invention, the external interface may receive an instruction from the external terminal. The image processing unit may generate the image data of the first image size and the image data of the second image size based on the instruction. The imaging unit may decrease the number of frames per unit time when the instruction has not been received.

According to a second aspect of the present invention, there is provided a display terminal including: an external interface which receives image data by wireless communication from the above-described imaging terminal; a received image determination unit which determines whether the image data received by the external interface is image data of the first image size or image data of the second image size; a first display unit which displays an image corresponding to the image data of the first image size; a second display unit which displays an image corresponding to the image data of the second image size; and a control unit which updates an image corresponding to the image data of the first image size to be displayed on the first display unit when the received image data has been determined to be the image data of the first image size, and which updates an image corresponding to the image data of the second image size to be displayed on the second display unit when the received image data has been determined to be the image data of the second image size.

Preferably, in the display terminal of the present invention, the received image determination unit may determine whether the image data received by the external interface is the image data of the first image size or the image data of the second image size by an image size of the received image data.

Preferably, in the display terminal of the present invention, the first display unit and the second display unit may be formed on a screen of the same display device.

According to a third aspect of the present invention, there is provided a display method including: a first step of receiving image data by wireless communication from the above-described imaging terminal; a second step of determining whether the image data received in the first step is image data of the first image size or image data of the second image size; a third step of displaying an image corresponding to the image data of the first image size on a first display unit; and a fourth step of displaying an image corresponding to the image data of the second image size on a second display unit, wherein when the image data received in the first step has been determined to be the image data of the first image size, an image corresponding to the image data of the first image size to be displayed on the first display unit is updated, and wherein when the received image data has been determined to be the image data of the second image size, an image corresponding to the image data of the second image size to be displayed on the second display unit is updated.

According to a fourth aspect of the present invention, there is provided an imaging system including: an imaging terminal which wirelessly transmits image data; and a display terminal which receives the image data, wherein the imaging terminal includes an imaging unit which sequentially outputs original image data into which a light flux incident on an imaging area has been photoelectrically converted in a frame unit; an image processing unit which generates image data of a first image size from original image data of a portion corresponding to a first area within the imaging area, and generates image data of a second image size from original image data of a portion corresponding to a second area as a partial area within the first area; an extraction unit which extracts a part from the image data of the first image size and the image data of the second image size generated by the image processing unit in the frame; and a first external interface which wirelessly and sequentially transmits the image data of the first image size and the image data of the second image size extracted by the extraction unit, and wherein the display terminal includes a second external interface which receives image data by wireless communication from the imaging terminal; a received image determination unit which determines whether the image data received by the second external interface is the image data of the first image size or the image data of the second image size; a first display unit which displays an image corresponding to the image data of the first image size; a second display unit which displays an image corresponding to the image data of the second image size; and a control unit which updates an image corresponding to the image data of the first image size to be displayed on the first display unit when the received image data has been determined to be the image data of the first image size, and which updates an image corresponding to the image data of the second image size to be displayed on the second display unit when the received image data has been determined to be the image data of the second image size.

DETAILED DESCRIPTION OF THE INVENTION

Embodiments of the present invention will now be described with reference to the drawings. The following embodiments have a characteristic that a live view may be remotely captured while checking images of a plurality of image sizes. The following embodiments have characteristics as follows.

In general, it is necessary for a frame rate of 15 fps or more so that a user can view a movie without a feeling of discomfort. A large image size is advantageous to check in focus. However, when a wireless LAN has been assumed, an image size is limited by a communication rate.

For example, a communication rate of 20 Mbps or more is necessary to secure the frame rate of 15 fps at the time of compressing a VGA (640×480) size image to a movie of JPEG which is a standard image format and transmitting the compressed image. However, a hardware configuration for high-speed communication becomes expensive, leading to an increase of cost and an increase of power consumption, which becomes a fatal problem for a mobile device.

Here, it is possible to reduce an image size, but the user may not sufficiently check the details of an image, for example, when the image size is reduce to a QVGA (320×240) size. Thus, it is not possible to determine whether or not a target is accurately in focus. According to the following embodiment, it is possible to adjust framing or focus without affecting operability when a communication rate is not high, and it is possible to capture an image by checking whether or not a target is in focus.

First Embodiment

Figure 1A:
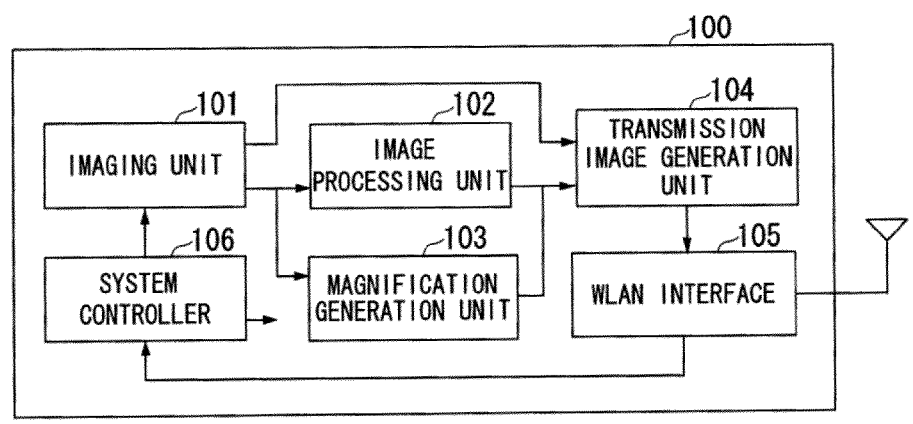
FIG. 1A is a block diagram showing the configuration of an imaging terminal according to a first embodiment of the present invention.

The first embodiment of the present invention will be described. FIG. 1 shows the configuration of an imaging terminal according to this embodiment. An imaging terminal 100 shown in FIG. 1A includes an imaging unit 101, an image processing unit 102, a magnification generation unit 103, a transmission image generation unit 104, a WLAN interface 105, and a system controller 106.

The imaging unit 101 sequentially generates and outputs original image data in a frame by photoelectrically converting a light flux incident on an imaging area. The image processing unit 102 generates image data of a first image size from original image data of a portion (for example, a portion corresponding to the entire image) corresponding to a first area within the imaging area, and conducts image processing such as compression for the image data. The magnification generation unit 103 generates image data of a second image size from original image data of a portion corresponding to a second area which is part of the above-described first area, and conducts image processing such as compression for the image data.

The transmission image generation unit 104 selects data to be transmitted to an external communication terminal (the operation terminal 200 to be described later in an example of this embodiment) from the image data of the first image size and the image data of the second image size in a frame. The WLAN interface 105 wirelessly communicates with the external communication terminal and sequentially transmits the image data of the first image size and the image data of the second image size in the frame. The system controller 106 controls each part described above.

Figure 1B:
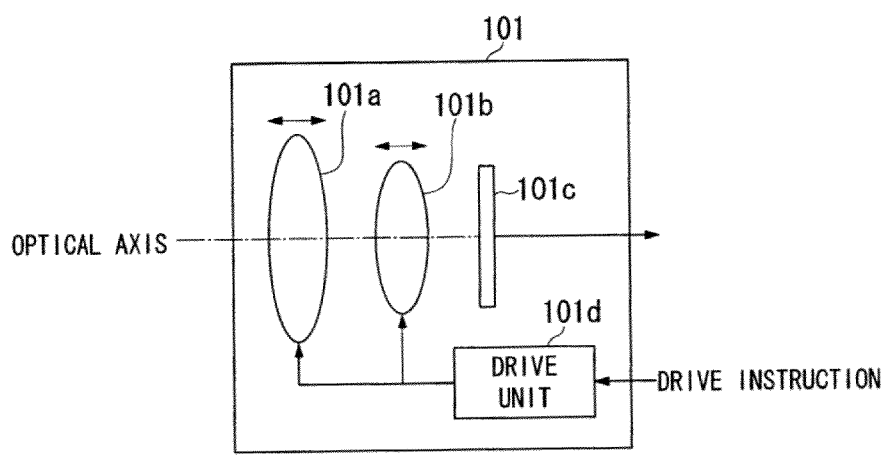
FIG. 1B is a block diagram showing the detailed configuration of an imaging unit provided in the imaging terminal according to the first embodiment of the present invention.

FIG. 1B shows the detailed configuration of the imaging unit 101. The imaging unit 101 has a focus lens 101a, a zoom lens 101b, an image pick-up unit 101c, and a drive unit 101d.

The focus lens 101a and the zoom lens 101b constitute a photographing optical system. The focus lens 101a may move in parallel along an optical axis to adjust the focus on an object image formed on the surface of the image pick-up unit 101c. Likewise, the zoom lens 101b may also move in parallel along the optical axis to vary a focus distance of the photographing optical system, thereby adjusting an image magnification on the object image formed on the surface of the image pick-up unit 101c. The image pick-up unit 101c converts the object image formed on the surface into an electrical signal, and outputs the electrical signal as the original image data to the outside. The photographing optical system including the above-described lenses moves along the optical axis by the drive unit 101d (for example, a stepping motor) according to a drive instruction from the system controller 106.

Figure 2:
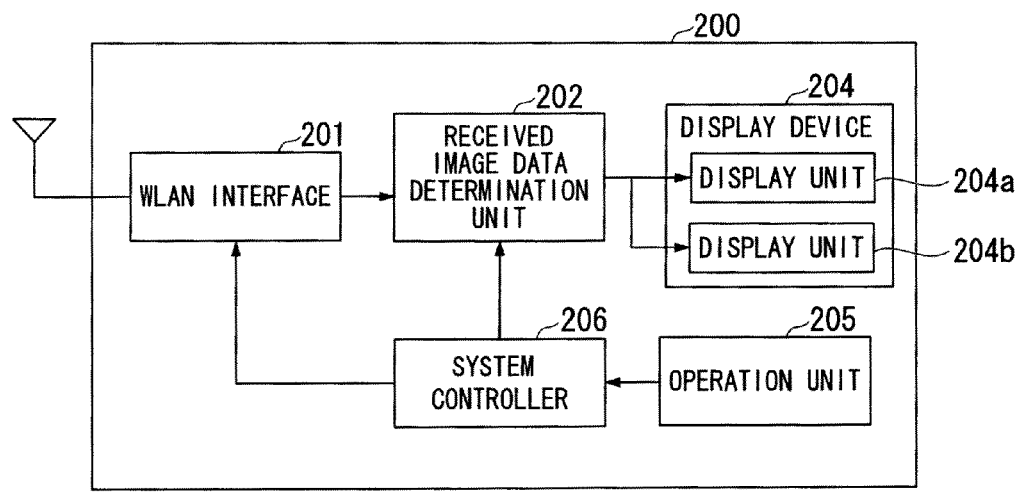
FIG. 2 is a block diagram showing the configuration of an operation terminal according to the first embodiment of the present invention.

FIG. 2 shows the configuration of the operation terminal according to this embodiment. The operation terminal 200 shown in FIG. 2 includes a WLAN interface 201, a received image data determination unit 202, a display device 204, an operation unit 205, and a system controller 206.

The WLAN interface 201 communicates with an external communication terminal (the imaging terminal 100 in an example of this embodiment), and receives image data by wireless communication in a frame. The received image data determination unit 202 determines a type of received image data in the frame. This type corresponds to the above-described two types of image sizes.

The display device 204 displays an image based on the received image data, an operation menu, or the like. The display device 204 includes a display unit 204a and a display unit 204b which display images divided for each type of received image data. In this embodiment, the display unit 204a corresponds to the image data of the first image size and the display unit 204b corresponds to the image data of the second image size. The display unit 204a and the display unit 204b include a buffer which temporarily holds received image data necessary for displaying an image. A display image is switched by updating the buffer. The user uses the operation unit 205 to perform a photographing operation or a setting operation related to photographing. The operation unit 205 outputs a signal corresponding to content of the user's operation to the system controller 206.

The system controller 206 controls each part described above. When the received image data has been determined to be image data of the first image size, the system controller 206 causes the received image data determination unit 202 to update an image corresponding to the image data of the first image size by rewriting data within the buffer of the display unit 204a by the image data of the first image size. When the received image data has been determined to be image data of the second image size, the system controller 206 further causes the received image data determination unit 202 to update an image corresponding to the image data of the second image size by rewriting data within the buffer of the display unit 204b by the image data of the second image size.

Figure 3:
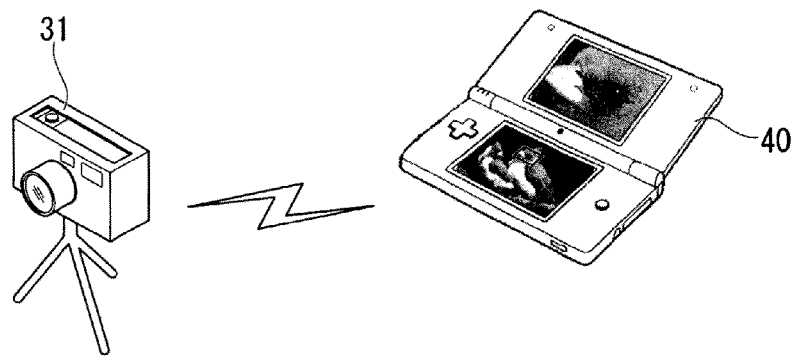
FIG. 3 is a reference diagram showing an example of the imaging terminal and the operation terminal according to the first embodiment of the present invention.

FIG. 3 shows an example of a usage scene in this embodiment. A camera 31 corresponds to the imaging terminal 100 and a mobile terminal 40 corresponds to the operation terminal 200. The camera 31 and the mobile terminal 40 form a wireless network in ad-hoc mode, and the camera 31 and the mobile terminal 40 are directly connected by a wireless LAN.

In this case, a live view captured by the camera 31 is transmitted to the mobile terminal 40 via the wireless network. The mobile terminal 40 causes the camera 31 to remotely capture a live view by performing an imaging-related operation (framing or focus adjustment) or an imaging instruction. At this time, an operation command corresponding to the user's operation is transmitted to the camera 31 via the wireless network and the camera 31 operates based on the command.

Figure 4:
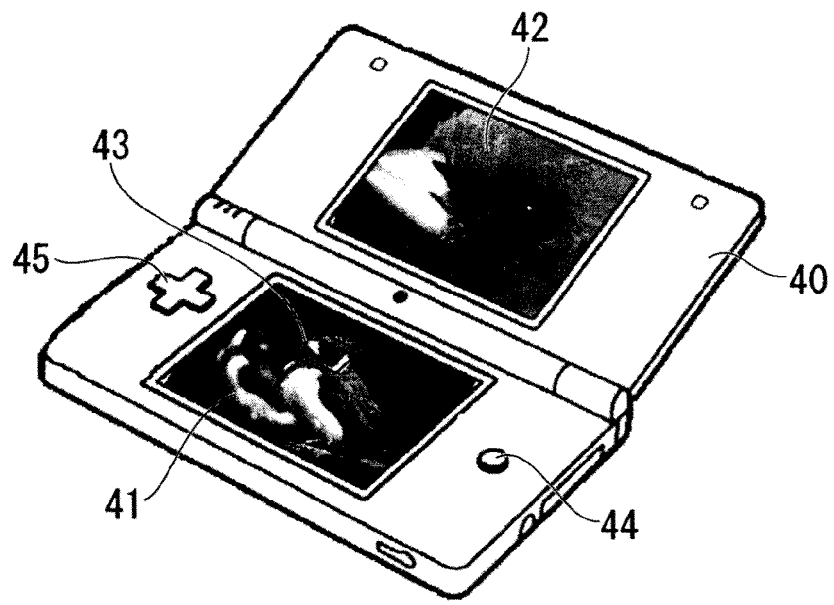
FIG. 4 is a perspective view of the operation terminal according to the first embodiment of the present invention.
Figure 5:
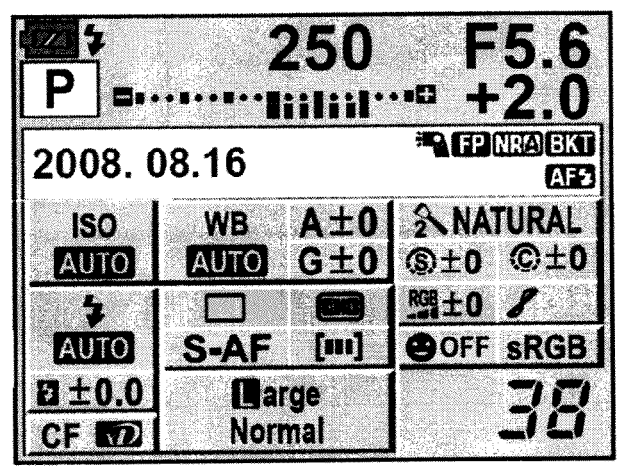
FIG. 5 is a reference diagram showing a setting screen in the first embodiment of the present invention.

FIG. 4 shows the external appearance of the mobile terminal 40. The mobile terminal 40 has two screen displays including a main display 41 corresponding to the display unit 204a and a sub display 42 corresponding to the display unit 204b. The main display 41 displays an image of the field of view received from the external imaging terminal 100 via the wireless network. The sub display 42 displays various types of settings related to photographing of the camera as shown in FIG. 5, and displays an enlarged image based on the image data of the second image size received from the external imaging terminal 100 during focus adjustment. The setting of the camera shown in FIG. 5 is an example, and various types of information related to photographing such as the shutter speed (250 in the example shown in FIG. 5), the aperture (F5.6 in the example shown in FIG. 5), the number of captured images (38 in the example shown in FIG. 5), and the like is displayed.

An enlargement area 43 is an area corresponding to the enlarged image displayed on the sub display 42. The user is able to arbitrarily designate a width or position of the enlargement area 43 by operating the operation unit 205. Information of the enlargement area 43 designated by the user is reported to the external imaging terminal 100 via the wireless network. The external imaging terminal 100 generates image data for the enlarged image based on the information to transmit the generated image data to the mobile terminal 40. The mobile terminal 40 displays the enlarged image on the sub display 42 on the basis of the received image data. Thereby, the user is able to check the enlarged image.

A push switch 44 performs a function equivalent to a release switch of the camera at photographing time. When the user performs an operation of pushing the push switch 44, a photographing start is instructed to the external imaging terminal 100. When setting information is displayed on the sub display 42, settings may be decided by operating the push switch 44 along with a cross key 45. The cross key 45 is used to switch a selection position of a setting screen at the time of setting photographic parameters, and is used to change a zoom magnification or a focus position at the time of photographing.

Figure 6:
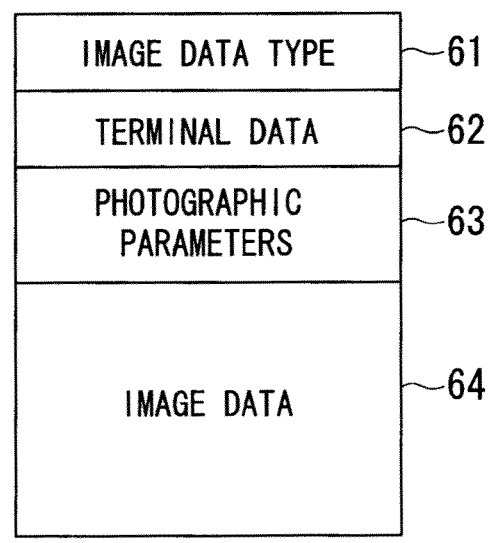
FIG. 6 is a reference diagram showing a structure of transmission data according to the first embodiment of the present invention.

FIG. 6 shows a structure of transmission data to be transmitted from the imaging terminal 100 to the operation terminal 200. The transmission data to be transmitted from the imaging terminal 100 has a header information part constituted by an image data type 61, terminal data 62, and photographic parameters 63, and a data part constituted by image data 64.

In the image data type 61, information related to a type of image data is stored. The type indicates image data of the field of view, enlarged image data of a designated area, or captured photographic data for recording. The terminal data 62 is a code for specifying the imaging terminal 100. When the operation terminal 200 has been connected to a plurality of imaging terminals 100, the imaging terminal 100 is specified using the terminal data 62. In relation to this code, for example, an IP address or a physical address can be used.

The photographic parameters 63 are setting information related to photographing such as a zoom magnification of the imaging terminal 100, setting of an optical system such as a focus position, an aperture value, or the like. The above-described header information is not limited thereto, other necessary information may be added if possible. The image data 64 is data compressed for each frame in an image compression system of, for example, JPEG or the like, and one piece of header information correspond to one-frame image data. In this embodiment, setting information related to photographing is included in header information, but the photographic parameters may be exchanged using a separate command.

Next, the operation of the imaging terminal 100 and the operation terminal 200 by this embodiment will be described. In this embodiment, for example, as shown in FIG. 3, the camera 31 as the imaging terminal 100 equipped with a wireless network function and the mobile terminal 40 as the operation terminal 200 are directly connected in ad-hoc mode to perform photographing via the wireless network.

Figure 7:
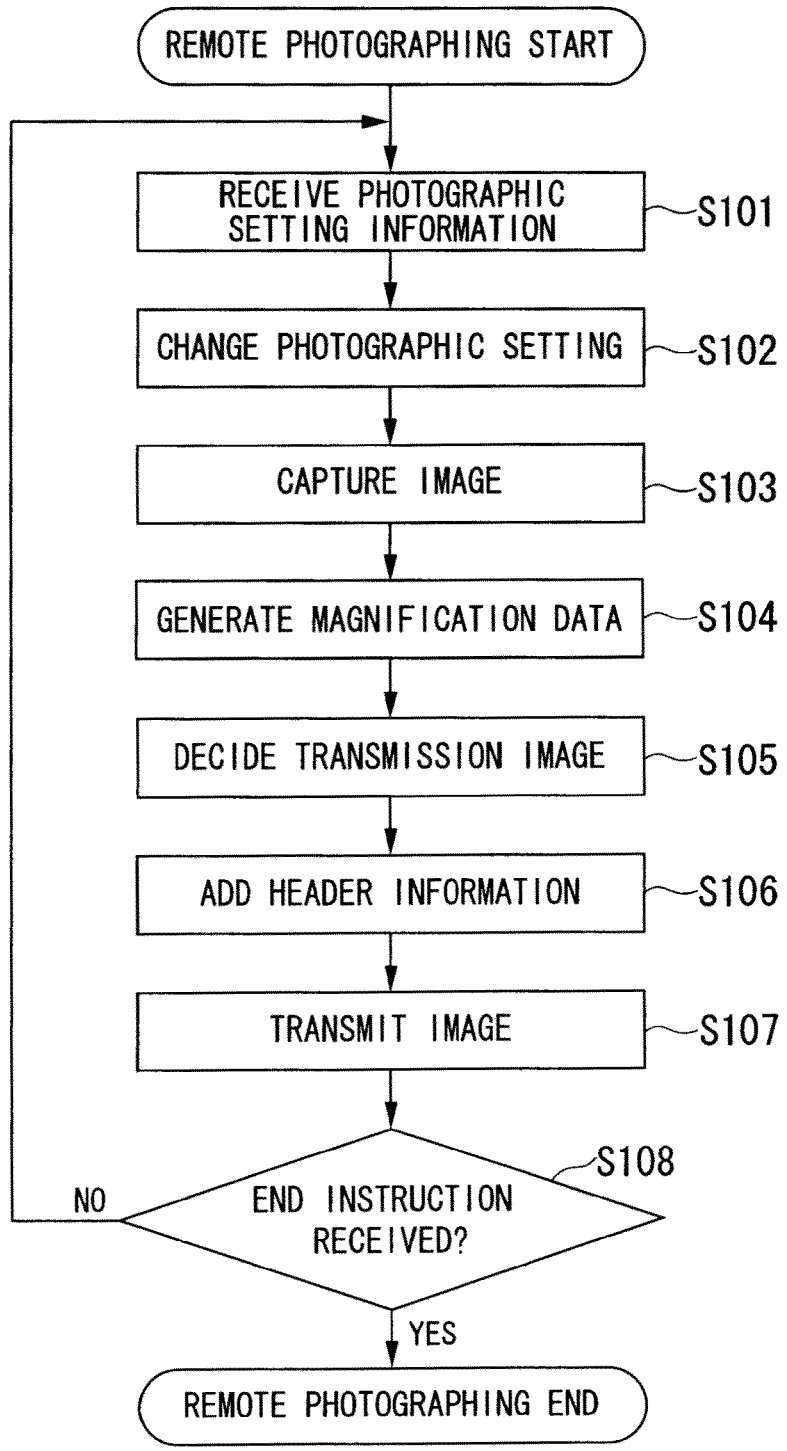
FIG. 7 is a flowchart showing a procedure of the operation of the imaging terminal according to the first embodiment of the present invention.

FIG. 7 shows a procedure of the operation of the imaging terminal 100 when a live view is captured by remote photographing. When a remote photographing start instruction has been received from the operation terminal 200, the operation shown in FIG. 7 is performed.

After starting the remote photographing, the system controller 106 checks whether or not photographic setting information (a photographic setting instruction) indicating the content of photographic settings has been received. The photographic setting is a setting content of focus or exposure related to photographing, or a range where the enlarged image is created. The photographic setting information is received by the WLAN interface 105 and is held by the system controller 106 (step S101).

When the photographic setting information has been received, the system controller 106 changes optical setting within the imaging unit 101, processing content of the image processing unit 102, or setting of a magnification range in the magnification generation unit 103 based on the photographic setting information (step S102). When the photographic setting information has not been received, the next process is directly conducted.

Subsequently, an image for displaying a live view is captured (step S103). At this time, an object image captured by the imaging unit 101 of the imaging terminal 100 is output to the image processing unit 102 and the magnification generation unit 103 as the original image data. The image processing unit 102 conducts predetermined image processing for captured image data based on a photographing instruction from the operation terminal 200, and compresses image data to generate an image having a set image size. It is preferable that a frame rate for displaying a movie without giving a feeling of discomfort to the user should be 15 fps or more since a live view is constantly transmitted. Thus, a limit of the image size for guaranteeing the frame rate greater than or equal to 15 fps is defined by a communication rate between terminals. In this embodiment, for example, the image size is set to a VGA (640×480) size. For example, when the number of effective pixels of the image pick-up unit 101c is 4096×3064 pixels, image data having the VGA (640×480) size is generated from the entire image data (4096×3064 pixels) obtained from the image pick-up unit 101c.

On the other hand, the magnification generation unit 103 clips a set image size of image data from the original image data output from the imaging unit 101, compresses the image data to an image having a predetermined image size, and generates magnification data (step S104). The magnification generation unit 103 internally stores information of an area where the enlarged image data is generated. In this embodiment, for example, the magnification data having the QVGA (320×240) size is generated from 640×480 image data in the image center. In an initial state, a position where the image data is clipped is a position of the image center, but it is possible to change a clipping position based on information regarding the clipping position received from the operation terminal 200 via the WLAN interface 105.

Subsequently, the transmission image generation unit 104 decides (selects) transmission target data from the image data of the field of view processed by the image processing unit 102 and the magnification data processed by the magnification generation unit 103 (step S105). At this time, the image data generated by both the image processing unit 102 and the magnification generation unit 103 may be transmission target data for one frame. The image data generated by one of the image processing unit 102 and the magnification generation unit 103 may be transmission target data for one frame.

For example, it is preferable to use the image data generated by one of the image processing unit 102 and the magnification generation unit 103 when the imaging unit 101 generates movie data at a frame rate of 30 fps and a limit of a frame rate of movie data to be transmitted by the WLAN interface 105 is 20 fps. When the imaging unit 101 generates movie data at a frame rate of 15 fps, it is possible to use the image data generated by both the image processing unit 102 and the magnification generation unit 103. In this case, the latter method has secondary effects such as a high power saving effect of the imaging unit 101. When photographic setting information has not been received without an operation instruction from the operation terminal 200, it is possible to reduce power consumption by decreasing a frame rate of the imaging unit 101.

A data priority of the magnification data generated by the magnification generation unit 103 becomes high during focus adjustment, and a priority of the image data generated by the image processing unit 102 becomes high during framing. That is, during the focus adjustment, a selection frequency of the enlarged image data generated by the magnification generation unit 103 becomes higher than a selection frequency of the image data generated by the image processing unit 102. During the framing, the selection frequency of the image data generated by the image processing unit 102 becomes higher than the selection rate of the magnification data generated by the magnification generation unit 103.

The system controller 106 distinguishes whether or not the focus adjustment is in progress by whether or not the focus lens is being driven. The system controller 106 distinguishes whether or not the framing is in progress by whether or not the zoom lens is being driven or whether or not the camera is panning. It is preferable that a gyro sensor or the like should be used to detect the motion of the camera. By performing the above-described control, the frame rate of the enlarged image of the sub display 42 becomes high during the focus adjustment, and the frame rate of the image of the field of view of the main display 41 becomes high during the framing.

In general, the user tends to check whether or not the magnification is in focus by observing the magnification during the focus adjustment, and tends to perform the framing by observing the image of the field of view during the framing. It becomes easy to check the focus adjustment and framing results by increasing the frame rate of a necessary image in response to an operation of focus adjustment and framing.

Here, an example of a relationship between a communication rate and a frame rate of a transmission image is shown. When a size of QVGA image data is about 25 k Bytes in the case where the imaging terminal 100 and the operation terminal 200 perform data communication at a communication rate of 5 Mbps via the wireless network, it is possible to transmit images at a frame rate of 25 frames per second. When the imaging unit 101 generates image data at a frame rate of 15 fps, the transmission image generation unit 104 selects image data generated by the image processing unit 102 for each frame, and selects enlarged image data generated by the magnification generation unit 103 in 2 frames of 3 frames. Thereby, image data of 25 frames per second is transmitted, a frame rate of live view images of the field of view becomes 15 fps, and a frame rate of magnification live view images becomes 10 fps. By changing a selection rate of the above-described images during the focus adjustment, the frame rate of live view images of the field of view becomes 10 fps, and the frame rate of magnification live view images becomes 15 fps.

Subsequent to the step S105, the transmission image generation unit 104 adds header information shown in FIG. 6 to the image data selected in the step S105 (step S106). The WLAN interface 105 transmits the image data to which the header information has been added to the operation terminal 200 (step S107).

Subsequently, the system controller 106 determines whether or not an end instruction has been received from the operation terminal 200 (step S108). The remote photographing is terminated when the end instruction has been received. However, if the end instruction has not been received, the process returns to step S101 and the above-described control is repeated.

Figure 8:
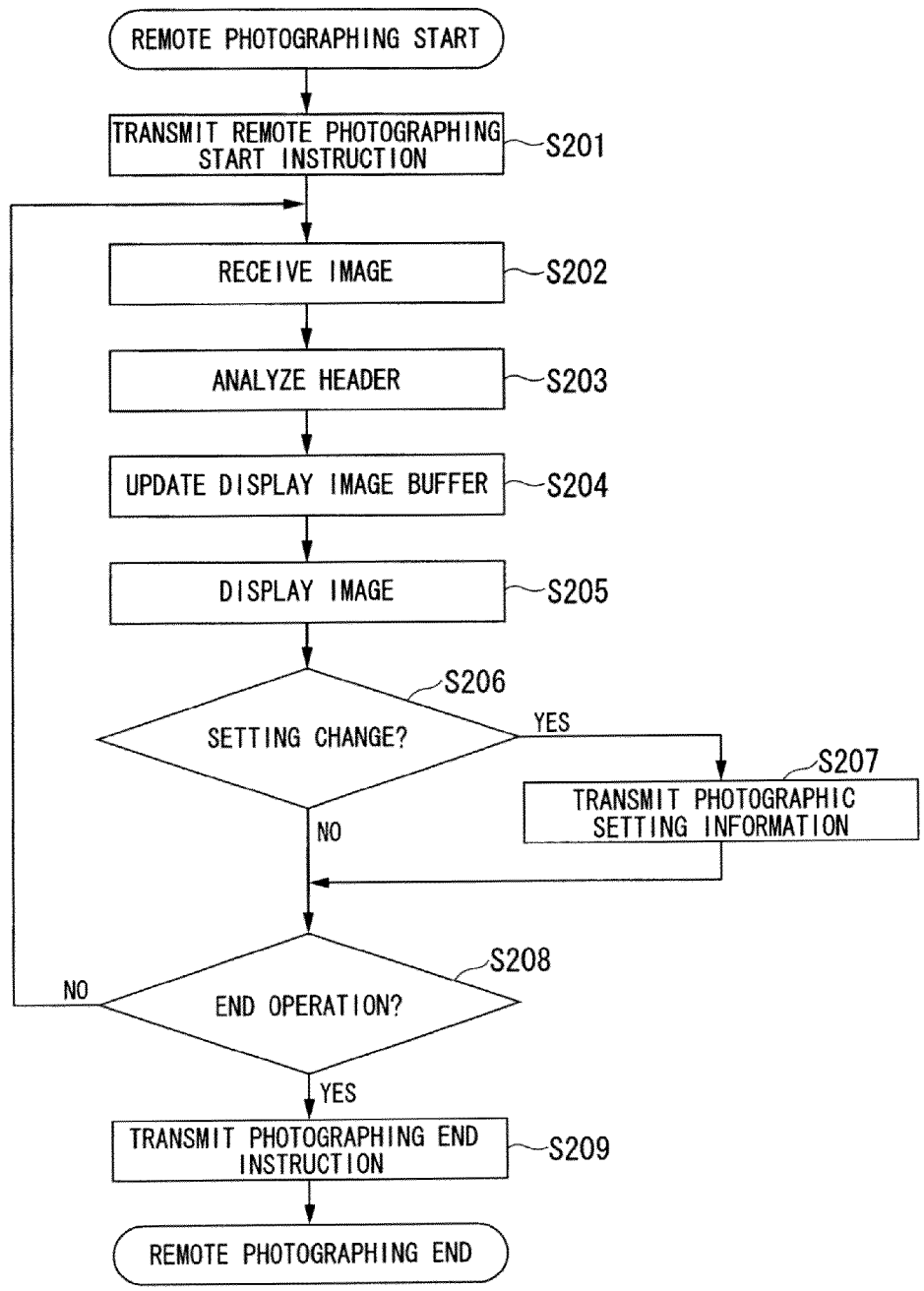
FIG. 8 is a flowchart showing a procedure of the operation of the operation terminal according to the first embodiment of the present invention.

FIG. 8 shows a procedure of the operation of the operation terminal 200 when a live view is captured by remote photographing. The operation shown in FIG. 8 is performed when the user has performed an operation of starting the remote photographing.

When the remote photographing is started, the system controller 206 transmits a remote photographing start instruction to the imaging terminal 100 via the WLAN interface 201 (step S201). Subsequently, the system controller 206 waits for live view image data to be received. When the image data has been received, the WLAN interface 201 outputs the received image data to the received image data determination unit 202 (step S202).

The received image data determination unit 202 analyzes a header of the image data and distinguishes a type of image (step S203). Based on the distinguishing result, the received image data determination unit 202 updates image data stored in the internal buffer from the display units 204a and 204b corresponding to the distinguished image type to the received image data (step S204).

Subsequently, the display units 204a and 204b display an image based on image data stored in the buffer (step S205). In the mobile terminal 40 shown in FIG. 4, an image of the field of view is displayed on the main display 41 corresponding to the display unit 204a, and a magnification is displayed on the sub display 42 corresponding to the display unit 204b.

Subsequently, the system controller 206 checks whether or not a setting change related to photographing has been made by monitoring the user's operation on the operation unit 205 (step S206). When the setting change has been made, the system controller 206 transmits photographic setting information including the content of the setting change to the imaging terminal 100 via the WLAN interface 201 (step S207). Subsequently, the process moves to step S208. When no setting change has been made, the process moves to S208 without transmitting the photographic setting information.

Subsequently, the system controller 206 checks whether or not a remote photographing end operation has been performed by monitoring the user's operation on the operation unit 205 (step S208). When no end operation has been performed, the process returns to step S202 and repeats updates of the display. However, when the end operation has been made, the system controller 206 transmits a photographing end instruction to the imaging terminal 100 via WLAN interface 201 (step S209), and ends a series of remote photographing processes.

Two types of images of an image of the field of view and a magnification are displayed as described above, but a plurality of enlarged images may be displayed and an image for which image processing such as white balance has been changed, not the magnification, may be displayed. In this case, the magnification generation unit 103 may be only changed to perform white balance image processing, and the magnification generating unit 103 may have a face recognition function to generate magnification data by clipping image data of an area which has been determined to be a face from image data output from the imaging unit 101. The mobile terminal 40 has been described as an example of the operation terminal 200, but the operation terminal 200 may be any wireless communication terminal having a display system and an operation system, and may be a camera.

According to this embodiment as described above, the imaging terminal 100 transmits image data of two different types of image sizes at the time of capturing a live view, the operation terminal 200 receives the image data, and an image is displayed on a display unit corresponding to each image data, so that the user is able to capture an image while checking images of a plurality of image sizes. In response to whether focus adjustment is in progress, or whether framing is in progress, at the side of the imaging terminal 100, it is possible to suppress an increase of an amount of communication data without affecting operability by changing frame rates of image data of the field of view and magnification data to be transmitted to the operation terminal 200.

Adjustment is facilitated when the user performs the focus adjustment while viewing an enlarged image displayed on the display unit 204b of the operation terminal 200 by increasing the frame rate of the magnification data more than that of the image data of the field of view during the focus adjustment. Also, framing is facilitated when the user performs the framing while viewing the image of the field of view displayed on the display unit 204a of the operation terminal 200 by increasing the frame rate of the image data of the field of view more than that of the magnification data during the framing.

It is possible to increase the frame rate since an amount of communication data may be suppressed by image compression.

In the operation terminal 200, the user is able to designate a magnification area and is able to enlarge and display a target area.

When the imaging terminal 100 does not receive an instruction (photographic setting information) from the operation terminal 200, it is possible to reduce power consumption by decreasing the number of frames per unit time of the original image data output by the imaging unit 101.

The operation terminal 200 is able to display two types of live view by determining the content of image data received from the imaging terminal 100, distinguishing which of the display unit 204a and the display unit 204b corresponds to the image data, and updating a display image of the corresponding display unit.

Second Embodiment

Next, the second embodiment of the present invention will be described. The configurations of the imaging terminal 100 and the operation terminal 200 in the second embodiment are the same as those of the first embodiment, and a type of operation terminal 200 and a live view image display method are different. Hereinafter, only differences from the first embodiment will be described.

Figure 9:
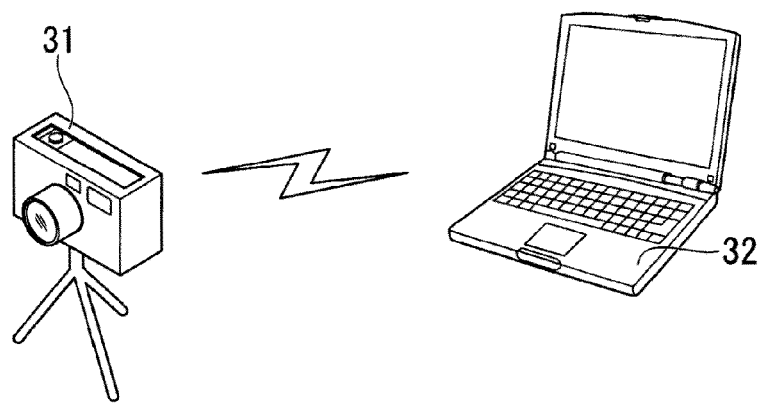
FIG. 9 is a reference diagram showing an example of an imaging terminal and an operation terminal according to a second embodiment of the present invention.

FIG. 9 shows an example of a usage scene in this embodiment. A camera 31 corresponds to the imaging terminal 100 and a laptop 32 corresponds to the operation terminal 200. The camera 31 and the laptop 32 form a wireless network in ad-hoc mode, and the camera 31 and the laptop 32 are directly connected by a wireless LAN.

In this case, a live view captured by the camera 31 is transmitted to the laptop 32 via the wireless network. The laptop 32 causes the camera 31 to remotely capture a live view by performing an imaging-related operation (framing or focus adjustment) or an imaging instruction. At this time, an operation command corresponding to the user's operation is transmitted to the camera 31 via the wireless network and the camera 31 operates based on the command.

Figure 10:
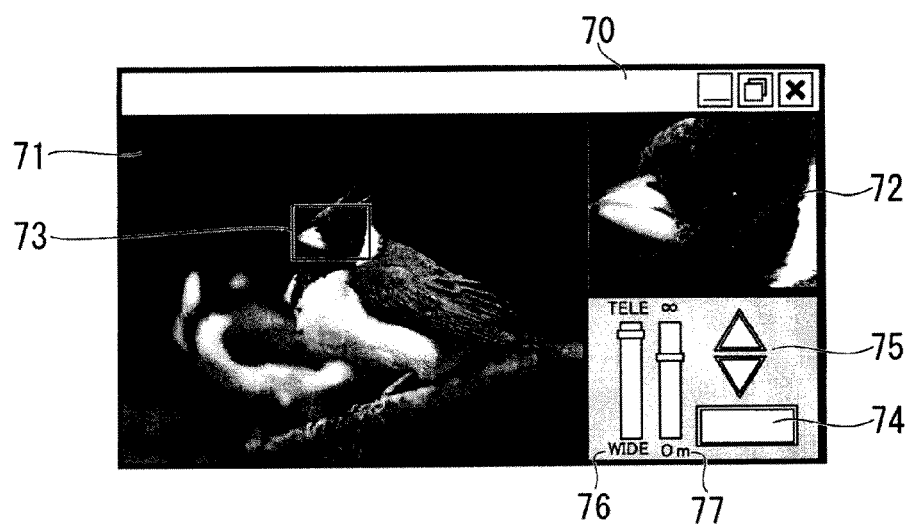
FIG. 10 is a reference diagram showing a screen of the operation terminal according to the second embodiment of the present invention.

FIG. 10 shows an example of an operation window displayed on a display of the laptop 32 which is the operation terminal 200 in this embodiment. An operation window 70 has a main display unit 71 which displays a QVGA (320×240) size image from the imaging terminal 100 and a sub display unit 72 which displays a QSIF (176×144) size image. The main display unit 71 corresponds to the display unit 204a in FIG. 2, and the sub display unit 72 corresponds to the display unit 204b.

A magnification area 73 indicates an area of an enlarged image displayed on the sub display unit 72. The imaging terminal 100 sets an enlargement area corresponding to the magnification area 73 by automatically recognizing an observation point. The imaging terminal 100 transmits information of the magnification area to the operation terminal 200. Based on the received information, the operation terminal 200 indicates the magnification area 73 on an image of the field of view on the main display unit 71.

In this embodiment, the observation point is determined by face recognition. In the imaging terminal 100, the magnification generation unit 103 generates enlarged image data by recognizing the face area based on image data output from the imaging unit 101 and clipping the image data of the face area.

A release switch 74 is a switch which allows the user to generate a photographing instruction. A photographing command is transmitted to the imaging terminal 100 by the release switch 74 is clicked by the user. When the user moves a mouse pointer on the release switch 74, the release switch 74 functions as a state corresponding to a half-pushed state. At this time, the operation terminal 200 instructs the imaging terminal 100 to start a focus operation.

An operation switch 75 is a switch which allows the user to adjust a zoom magnification or a focus position. The user operates the operation switch 75 to transmit a command for performing a magnification change operation or a focus adjustment operation to the imaging terminal 100.

Zoom magnification display 76 and focus position display 77 indicate setting situations of the optical system of the imaging terminal 100 by displaying indicators. The indications of the zoom magnification display 76 and the focus position display 77 are updated based on photographic parameters added to a received image data to be described later.

Next, differences from the first embodiment will be described in terms of the operation of the imaging terminal 100 and the operation terminal 200 according to this embodiment. First, when a normal live view is captured, the image processing unit 102 converts the original image data generated by the imaging unit 101 into a QVGA size JPEG data. Simultaneously, the magnification generation unit 103 clips image data based on a designated position and size from the operation terminal 200, and generates QSIF size JPEG data.

The transmission image generation unit 104 sequentially transmits image data by adding header information to image data of the field of view from the image processing unit 102 and enlarged image data from the magnification generation unit 103 generated for each frame. Here, assuming that a JPEG data size of QVGA is 25 k Bytes and a JPEG data size of SIF is 15 k Bytes when communication via the wireless network between the imaging terminal 100 and the operation terminal 200 is performed at a communication rate of 5 Mbps in an example regarding an amount of transmission data, it is possible to transmit data at a frame rate of 15 fps for each size.

Subsequently, when a focus adjustment instruction has been received from the operation terminal 200, the system controller 106 sets a size of image data of the field of view generated by the image processing unit 102 to the QSIF size, and sets a size of magnification data generated by the magnification generation unit 103 to the QVGA size. That is, image sizes of the image of the field of view and the magnification are reversed during focus adjustment.

Subsequently, in the operation terminal 200, the received image data determination unit 202 determines a type of received image data based on an image size, that is, a image size, updates a display image of the display unit 204a when the received image data has the QVGA size, and updates a display image of the display unit 204b when the received image data has the QSIF size. By the above-described control, the image of the field of view is displayed on the main display unit 71 and the enlarged image is displayed on the sub display unit 72 when a normal live view is captured, but the magnification is displayed on the main display unit 71 and the image of the field of view is displayed on the sub display unit 72 when the focus adjustment is performed.

In this embodiment, header information may be omitted in image data since an image is distinguished by an image size. In this case, it is preferable that information regarding the photographic parameters 63 shown in FIG. 6 should be transmitted by performing separate command communication. The image size or the frame rate is not limited to QVGA or QSIF, or 15 fps, but may be the VGA size or 30 fps or the like.

In this embodiment, face recognition is used for a determination of an observation point, but the following system is possible as an application example thereof. For example, an operator may simultaneously check an image transmitted from the installed camera and an enlarged image of a face, and capture an image by performing a photographing operation when there is a person of interest. In this case, since the face may be checked by the enlarged image, the person may be easily specified and the camera may be used for the purpose of a monitoring camera or the like.

According to this embodiment as described above, it is easily checked whether or not a target is in focus since it is possible for the user to simultaneously check an image of the field of view and a magnification of an observation portion and also to check an enlargement portion by a high-definition image during focus adjustment.

Since an image size of the magnification is larger than that of the image of the field of view during the focus adjustment, the user can easily check and adjust the focus by a high-definition image.

Since it is possible for the user to check a magnification of a face along with an image of the field of view, the user is able to capture an image while checking the variation of an expression or the like.

It is not necessary to add header information to image data by distinguishing an image by an image size.

A communication terminal having only one display device is also able to display a plurality of real-time images by providing two display units on the same screen.

Third Embodiment

Next, the third embodiment of the present invention will be described. In the third embodiment, the configurations of the imaging terminal 100 and the operation terminal 200 are the same as those of the first embodiment, and the functions of the image processing unit 102, the magnification generation unit 103, and the transmission image generation unit 104 of the imaging terminal 100 are different. In the operation terminal 200, with respect to the display device 204, only by the display unit 204a, the function of the received image data determination unit 202 is unnecessary.

Figure 11:
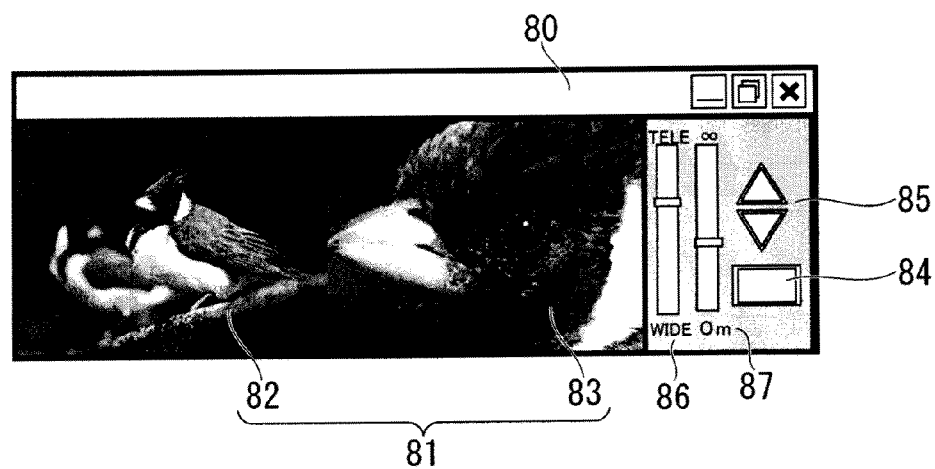
FIG. 11 is a reference diagram showing a screen of the operation terminal according to a third embodiment of the present invention.

FIG. 11 shows an example of an image displayed by the operation terminal 200 in this embodiment. An operation window 80 of FIG. 11 is a window displayed on the display of the laptop 32 in FIG. 9. In the operation window 80, an image of a size of 640×240 from the imaging terminal 100 is displayed on a display area 81. The display image is a combined image of two arranged images having a QVGA (320×240) size. An image displayed in an entire display area 82 is an image of the field of view, and an image displayed in an enlarged display area 83 is a magnification of a predetermined portion.

A release switch 84 is a switch which allows the user to generate a photographing instruction. The user transmits a photographing command to the imaging terminal 100 by clicking the release switch 84. When the user moves a mouse pointer on the release switch 84, the release switch 84 functions as a state corresponding to a half-pushed state. At this time, the operation terminal 200 instructs the imaging terminal 100 to start a focus operation.

An operation switch 85 is a switch which allows the user to adjust a zoom magnification or a focus position. The user operates the operation switch 85 to transmit a command for performing a magnification change operation or a focus adjustment operation to the imaging terminal 100.

Zoom magnification display 86 and focus position display 87 indicate setting situations of the optical system of the imaging terminal 100 by displaying indicators. The indications of the zoom magnification display 86 and the focus position display 87 are updated based on photographic parameters added to a received image data.

Next, differences from other embodiments will be described in terms of the operation of the imaging terminal 100 and the operation terminal 200 according to this embodiment. In the imaging terminal 100, the image processing unit 102 converts the field of view of the original image data generated by the imaging unit 101 into a QVGA size, compresses the image data at a predetermined compression rate, and generates image data of the field of view.

The magnification generation unit 103 converts a part of the original image data generated by the imaging unit 101 into the QVGA size, compresses the image data at a predetermined compression rate, and generates magnification data. In terms of the compression rate, it is possible to set different values in the image processing unit 102 and the magnification generation unit 103, but this is determined by the system controller 106. The system controller 106 decreases the compression rate of the magnification generation unit 103 as compared with the compression rate of the image processing unit 102 when the focus is adjusted by an instruction from the operation terminal 200, and decreases the compression rate of the image processing unit 102 as compared with the compression rate of the magnification generation unit 103 in other cases.

The transmission image generation unit 104 generates one image data having a 640×240 size by combining image data generated by the image processing unit 102 and the magnification generation unit 103, and transmits the generated image data to the operation terminal 200 via the WLAN interface 105. The operation terminal 200 directly displays image data received from the WLAN interface 201 on the display device 204.

An image size is the QVGA size in this embodiment, but is not limited thereto. When image data generated by the image processing unit 102 and the magnification generation unit 103 is combined, two images are horizontally arranged and combined, but may be vertically arranged and may be overlapped and displayed by changing an image size.

When the focus of the imaging terminal 100 is adjusted from the operation terminal 200 according to this embodiment as described above, a compression rate of the magnification is decreased. Thus, the displayed magnification becomes clear and the focus can be easily checked. Since the compression rate of an image of the field of view is decreased in other cases, the image of the field of view becomes clear and framing can be easily checked.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging terminal comprising:
    an imaging unit which sequentially outputs original image data into which a light flux incident on an imaging area has been photoelectrically converted in a frame;
    an image processing unit which generates image data of a first image size from the original image data of a portion corresponding to a first area within the imaging area, and generates image data of a second image size from the original image data of a portion corresponding to a second area as a partial area within the first area;
    an extraction unit which extracts a part from the image data of the first image size and the image data of the second image size generated by the image processing unit in the frame; and
    an external interface which wirelessly sequentially transmits the image data of the first image size and the image data of the second image size extracted by the extraction unit, wherein the imaging unit includes an optical system having a focus lens which adjusts focus, and wherein the image processing unit sets the second image size to be larger than the first image size during driving of the focus lens.

2. The imaging terminal according to claim 1, wherein the image processing unit recognizes an area of a face portion of a person within the imaging area from the original image data, and decides the second area based on a recognition result of the area of the face portion.

3. The imaging terminal according to claim 1, wherein the external interface receives an instruction from an external terminal, and wherein the image processing unit decides the second area based on the instruction.

4. A display terminal comprising:

a first external interface which receives image data wirelessly transmitted from an imaging terminal, wherein the imaging terminal includes: an imaging unit which sequentially outputs original image data into which a light flux incident on an imaging area has been photoelectrically converted in a frame; an image processing unit which generates image data of a first image size from the original image data of a portion corresponding to a first area within the imaging area, and generates image data of a second image size from the original image data of a portion corresponding to a second area as a partial area within the first area an extraction unit which extracts a part from the image data of the first image size and the image data of the second image size generated by the image processing unit in the frame; and a second external interface which wirelessly sequentially transmits the image data of the first image size and the image data of the second image size extracted by the extraction unit;

a received image determination unit which determines whether the image data received by the first external interface is image data of the first image size or image data of the second image size;

a first display unit which displays an image corresponding to the image data of the first image size;

a second display unit which displays an image corresponding to the image data of the second image size; and a control unit which updates an image corresponding to the image data of the first image size to be displayed on the first display unit when the received image data has been determined to be the image data of the first image size, and which updates an image corresponding to the image data of the second image size to be displayed on the second display unit when the received image data has been determined to be the image data of the second image size, wherein the received image determination unit determines whether the image data received by the first external interface is the image data of the first image size or the image data of the second image size by an image size of the received image data.

5. An imaging system comprising:

an imaging terminal which wirelessly transmits image data; and a display terminal which receives the image data, wherein the imaging terminal includes an imaging unit which sequentially outputs original image data into which a light flux incident on an imaging area has been photoelectrically converted in a frame;

an image processing unit which generates image data of a first image size from original image data of a portion corresponding to a first area within the imaging area, and generates image data of a second image size from original image data of a portion corresponding to a second area as a partial area within the first area;

an extraction unit which extracts a part from the image data of the first image size and the image data of the second image size generated by the image processing unit in the frame; and a first external interface which wirelessly sequentially transmits the image data of the first image size and the image data of the second image size extracted by the extraction unit, and wherein the display terminal includes a second external interface which receives image data wirelessly transmitted from the imaging terminal;

a received image determination unit which determines whether the image data received by the second external interface is the image data of the first image size or the image data of the second image size;

a first display unit which displays an image corresponding to the image data of the first image size;

a second display unit which displays an image corresponding to the image data of the second image size; and a control unit which updates an image corresponding to the image data of the first image size to be displayed on the first display unit when the received image data has been determined to be the image data of the first image size, and which updates an image corresponding to the image data of the second image size to be displayed on the second display unit when the received image data has been determined to be the image data of the second image size.

6. The imaging system according to claim 5, wherein the imaging unit includes an optical system having a focus lens which adjusts focus, and the image processing unit sets the second image size to be larger than the first image size during driving of the focus lens.

7. The imaging system according to claim 5, wherein the received image determination unit determinates whether the image data received by the second external interface is the image data of the first image size or the image data of the second image size by an image size of the received image data.

* * * * *